(12) United States Patent
John et al.

(10) Patent No.: US 11,761,469 B2
(45) Date of Patent: Sep. 19, 2023

(54) CURVED PRONG FASTENER

(71) Applicant: ILLINOIS TOOL WORKS INC., Glenview, IL (US)

(72) Inventors: Ciby John, Hammond, IN (US); Kileean E. Bell, Crete, IL (US)

(73) Assignee: Illinois Tool Works Inc., Glenview, IL (US)

( * ) Notice: Subject to any disclaimer, the term of this patent is extended or adjusted under 35 U.S.C. 154(b) by 526 days.

(21) Appl. No.: 17/097,546

(22) Filed: Nov. 13, 2020

(65) Prior Publication Data

US 2021/0156412 A1    May 27, 2021

Related U.S. Application Data

(60) Provisional application No. 62/939,316, filed on Nov. 22, 2019.

(51) Int. Cl.
*F16B 21/07* (2006.01)
*F16B 5/06* (2006.01)

(52) U.S. Cl.
CPC .......... *F16B 21/076* (2013.01); *F16B 5/0621* (2013.01)

(58) Field of Classification Search
CPC .... F16B 21/076; F16B 5/0621; F16B 21/086; F16B 21/078; F16B 5/0657; F16B 5/0635; B60R 13/0206
See application file for complete search history.

(56) References Cited

U.S. PATENT DOCUMENTS

| | | | | |
|---|---|---|---|---|
| 3,871,430 A | * | 3/1975 | Meyer | F16B 21/086 411/970 |
| 5,795,118 A | * | 8/1998 | Osada | F16B 5/065 411/908 |
| 7,186,068 B2 | * | 3/2007 | Zoubek | F16B 21/086 411/510 |
| 7,967,539 B2 | * | 6/2011 | Huet | F16B 21/086 411/509 |
| 9,145,909 B2 | * | 9/2015 | Lepper | F16B 21/082 |
| 9,303,672 B2 | * | 4/2016 | Lepper | F16B 19/1027 |
| 10,830,270 B2 | * | 11/2020 | Lepper | F16B 21/086 |
| 10,914,336 B2 | * | 2/2021 | Edland | F16B 21/086 |
| 11,242,879 B2 | * | 2/2022 | Kolb | F16B 21/086 |
| 2002/0131846 A1 | * | 9/2002 | Kojima | F16B 21/086 411/508 |
| 2004/0238203 A1 | * | 12/2004 | Arai | B60R 16/0215 174/135 |
| 2005/0244250 A1 | * | 11/2005 | Okada | F16B 21/086 411/508 |
| 2008/0066266 A1 | * | 3/2008 | Scroggie | F16B 21/086 24/297 |
| 2009/0265900 A1 | * | 10/2009 | Okada | F16B 21/086 24/458 |
| 2010/0293761 A1 | * | 11/2010 | Koike | F16B 21/09 24/458 |

(Continued)

*Primary Examiner* — David M Upchurch
(74) *Attorney, Agent, or Firm* — Quarles & Brady LLP

(57) ABSTRACT

The present disclosure relates to a fastener for coupling a base component on which the fastener is deployed to a target component having an opening with which the fastener is configured to couple. The fastener has a core, a cap, and a plurality of prongs. Each prong has a shelf and may also have a ramp. The fastener is configured to couple with a variety of openings having different sizes, shapes, and dimensions.

20 Claims, 8 Drawing Sheets

(56) References Cited

U.S. PATENT DOCUMENTS

2010/0322743 A1* 12/2010 Ostergren ............. F16B 21/086
                                                            411/508
2015/0135484 A1*  5/2015 Leverger ............... F16B 13/045
                                                             24/292
2015/0292541 A1* 10/2015 Risdale ................ F16B 19/002
                                                          29/525.01

* cited by examiner

CURVED PRONG FASTENER

RELATED APPLICATIONS

This application claims the benefit of U.S. Provisional Application No. 62/939,316 filed on 22 Nov. 2019, which is hereby incorporated by reference in its entirety.

FIELD OF THE DISCLOSURE

Embodiments of the present disclosure generally relate to pronged fasteners.

BACKGROUND

Fasteners are used across numerous industries. In the automotive industry, fasteners are often used to hold a panel in a desired position. Fasteners can take a number of different forms, depending on the nature of the objects to be fastened and other requirements of the application. In some situations, it may be desired that a fastener be capable of coupling with an opening in the surface of a target object. In some situations, it may be desired that a fastener be capable of coupling with openings of varying dimensions and/or target objects of varying dimensions. The present disclosure addresses some of these concerns.

SUMMARY

In one aspect, a fastener includes a core, a cap, and a plurality of prongs extending from the core. Each prong has a shelf having a top surface, an inner edge, and an outer edge. Each shelf has a plurality of different gap heights and a plurality of different widths. The gap height is defined by the distance between the top surface of the shelf and a bottom surface of the cap, and the widths are defined by the distance between the outer edge of the shelf and the inner edge of the shelf.

In one aspect, a fastener includes a core having an exterior surface, a cap having a bottom surface, and a plurality of prongs extending from the core. Each prong has a ramp extending from the core. Each ramp has a top edge with a first thickness and a bottom edge with a second thickness, where the second thickness is greater than the first thickness. Each prong also has a shelf extending away from the bottom edge of the ramp. Each shelf has a top end and a bottom end, where the distance between the bottom surface of the cap and the bottom end of the shelf is greater than the distance between the bottom surface of the cap and the top end of the shelf.

In one aspect, a fastener includes a core, a cap, and a plurality of prongs extending from the core. Each prong has a ramp extending from the core. Each ramp has an outside surface, a top edge, and a bottom edge. Each prong also has a shelf extending away from the core. Each shelf has a top surface, an outer edge, a top end, and a bottom end. The distance between an exterior surface of the core and the outside surface of the ramp is greater at the bottom edge of the ramp than at the top edge of the ramp. Additionally, the distance between a bottom surface of the cap and the top surface of the shelf is greater at the bottom end of the shelf than at the top end of the shelf.

BRIEF DESCRIPTION OF THE DRAWINGS

FIGS. 9A-9C are views of an embodiment fastener that is coupled with a target component, wherein FIG. 9A is a side elevational view of a top of the fastener, FIG. 9B is a top view of the top of the fastener, and FIG. 9C is a side elevational view of the bottom of the fastener.

Figure 1:
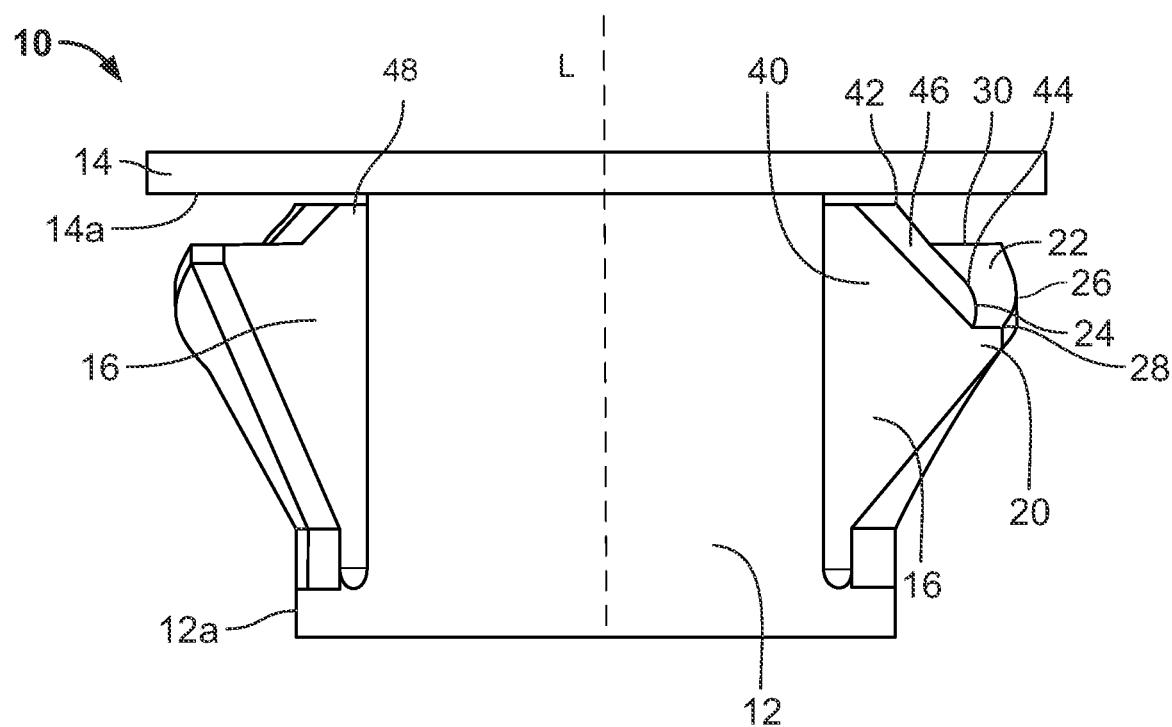
FIG. 1 is a side elevational view of a fastener according to an embodiment of the present disclosure.

Before the embodiments of the disclosure are explained in detail, it is to be understood that the disclosure is not limited in its application to the details of construction and the arrangement of the components set forth in the following description or illustrated in the drawings. The disclosure is capable of other embodiments and of being practiced or being carried out in various ways. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof.

DETAILED DESCRIPTION

Aspects of the present disclosure provide a fastener for coupling objects, where the fastener is deployed with one of the objects (a base component) and the other object(s) (a target component) contains an opening with which the fastener is configured to couple.

An advantage of a fastener of the present disclosure is that a single fastener may be configured to couple with different openings, even though the openings may be of different shapes and sizes. For example, a single embodiment fastener may be configured to couple with openings having different shapes, different dimensions (such as different diameters), and different thicknesses (referring to the thickness of the material through which the opening is disposed). As a result, a base component having a single embodiment fastener can be easily combined with a wide variety of target components. This may be especially useful for applications where it is necessary to manufacture a base component prior to knowing which target component will be coupled to the base. For example, this is a common problem in the automotive industry, where it may be difficult for a manufacturer of a frame to know what panel will be selected for use with the frame.

Turning now to FIG. 1, an embodiment fastener 10 includes a core 12 having an exterior surface 12a, a cap 14 having a bottom surface 14a, and a plurality of prongs 16. Each prong 16 has a shelf 20 with a top surface 22, an inner edge 24, and an outer edge 26.

Figure 3:
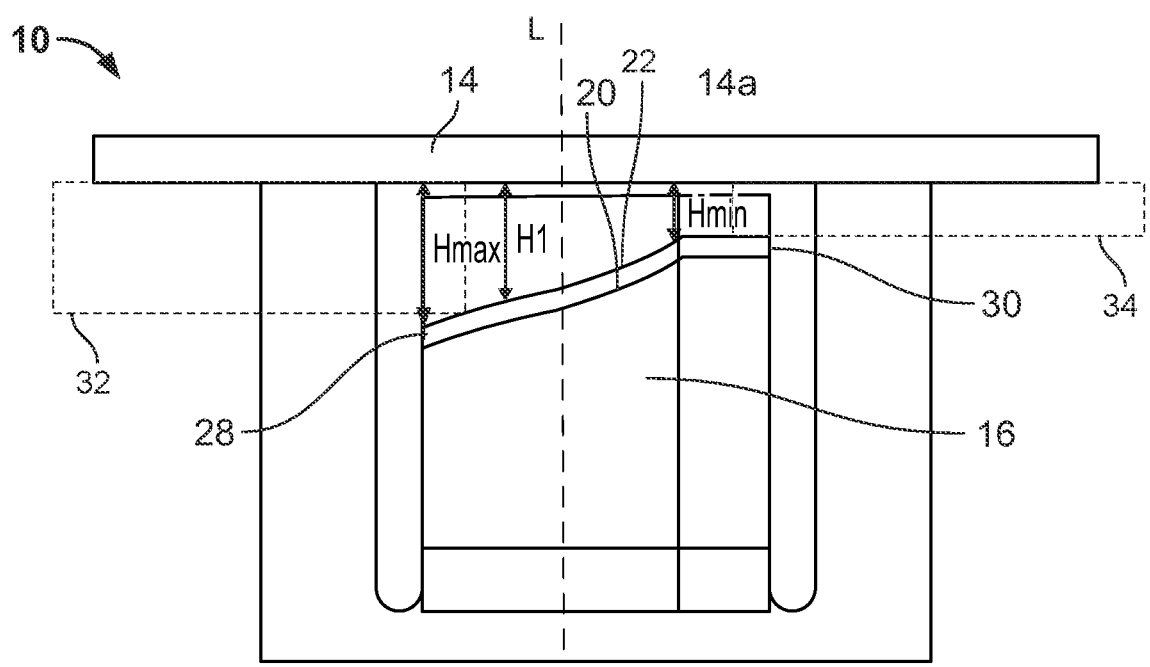
FIG. 3 is another side elevational view of the fastener of FIG. 1 from an alternative angle.

As shown in FIG. 1, the core 12 of the fastener 10 is cylindrically shaped. However, in other embodiments the core 12 may have any suitable shape, including a rectangular prism, a hexagonal prism, an octagonal prism, and the like. The dimensions of the core 12 are not particularly limited and may be adapted based on the size(s) of openings that are common among the target components of a particular application. The exterior surface 12a of the core 12 may be continuous around the entire circumference of the core 12, or it may be interrupted at points (as shown in FIG. 3).

The fastener 10 also has a cap 14 that is positioned on top of the core 12. The cap 14 may be integral with the core 12. As used herein, the term "integral" means that the pieces are formed from the same material and form one continuous piece, without the need for attachment to each other via fasteners, adhesives, or the like. Alternatively, the cap 14 may be formed separately from the core 12 and subsequently fastened, adhered, or otherwise attached to the core 12. The shape of the cap 14 is not particularly limited. In the embodiment shown in FIG. 1, the cap 14 has a thin cylindrical shape. The cap 14 can have a variety of dimensions. However, the smallest width or diameter of the cap 14 must be greater than the largest width or diameter of the core 12. In an embodiment, the smallest width or diameter of the cap 14 may also be greater than the combination of the largest width/diameter of the core 12 and the largest width of the top surface 22 of at least one shelf 20. In embodiments having two prongs 16 that are positioned opposite each other about the core 12, the cap 14 may have a smallest width or diameter that is greater than the combination of the largest width/diameter of the core 12 and the combined widths of the top surfaces 22 of both prongs 16. Put another way, for certain application it may be preferable that the cap 14 is large enough to cover the core 12 and the top surface(s) 22 of each prong 16. However, for other applications it may be preferable that the cap 14 is only large enough to cover the core 12 and a portion of the top surface(s) 22 of each prong 16.

Figure 2:
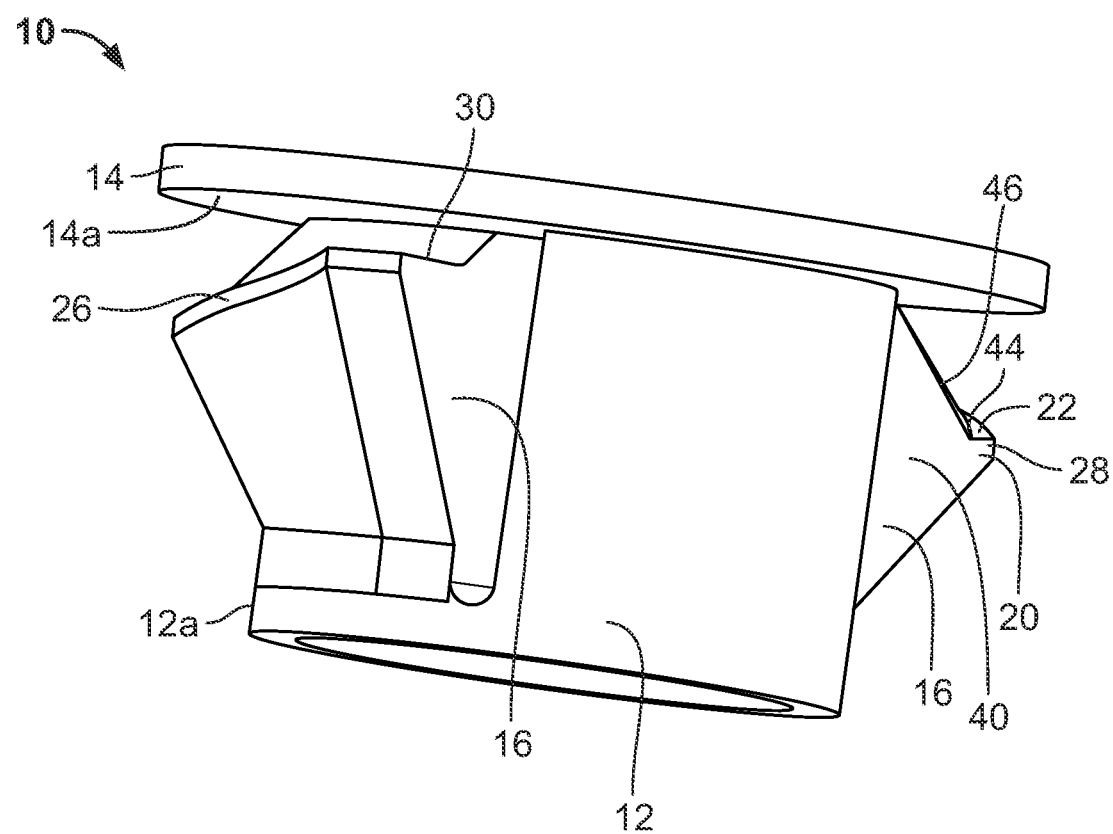
FIG. 2 is a side perspective view of the fastener of FIG. 1.

Turning to FIG. 2, the cap 14 has a bottom surface 14a. The bottom surface 14a of the cap 14 may be flat. Alternatively, the bottom surface 14a of the cap 14a may have any shape suitable for engaging a target component in a particular application.

With reference to FIGS. 1 and 2, the fastener 10 has a plurality of prongs 16. Each prong 16 extends or protrudes from the core 12. As shown in FIG. 1, each prong 16 may have a primarily triangular shape. However, the shape of the prongs 16 is not particularly limited, and each prong 16 may have any shape suitable for a particular application of the fastener 10. Each prong 16 may be integral to both the core 12 and the cap 14, such that the core 12, the cap 14, and the prongs 16 form a single, unitary, integral component. Alternatively, the prongs 16 may be formed separately from the core 12 and subsequently fastened, adhered, or otherwise attached to the core 12. In an embodiment, the core 12, the cap 14, and the prongs 16 form a single, unitary, integral component, wherein the core 12, the cap 14, and the prongs 16 are all composed of the same material.

Turning to FIG. 3, each prong 16 has a shelf 20 with a top surface 22. Each shelf has a plurality of different gap heights H, with individual gap heights $H_1$, $H_2$, $H_3$, etc. Each different gap height H of the shelf 20 is defined by the vertical distance between the top surface 22 of the shelf 20 and the bottom surface 14a of the cap 14, at a specific point along the shelf 20. The gap height H can alternatively be defined as the distance between the shelf 20 and the cap 14 in the longitudinal direction L of the fastener 10. In some embodiments, the prong 16 and/or the shelf 20 may not touch the bottom surface 14a of the cap 14 at any point, and therefore the gap height of the shelf 20 will be greater than zero along the entire length of the shelf 20. It may be appreciated that the shelf 20 can have an infinite number of individual gap heights H, relating to the infinite possible number of points along the top surface 22 of the shelf 20.

Figure 6:
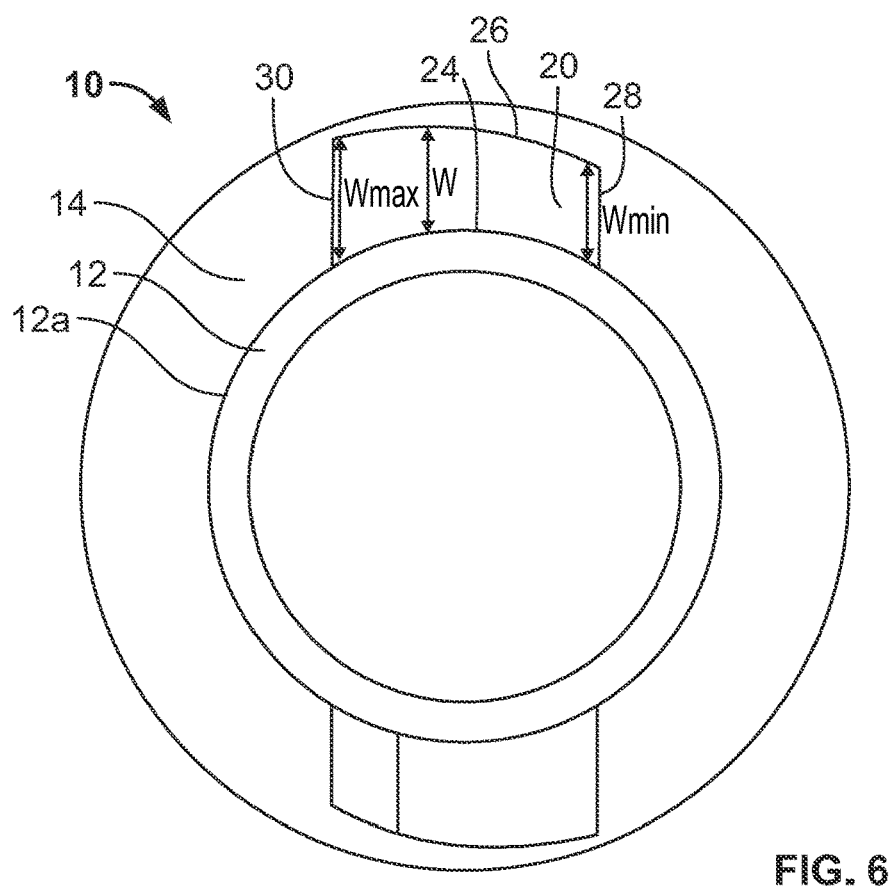
FIG. 6 is a bottom view of the fastener of FIG. 1.

As may best be seen in FIG. 6, each shelf also has a plurality of different widths W, with individual widths $W_1$, $W_2$, $W_3$, etc. Each width W of the shelf 20 is defined by the distance between the outer edge 26 and the inner edge 24 of the shelf 20, at a specific point along the shelf 20. The width W of the shelf 20 can alternatively be defined as the length of the top surface 22 of the shelf 20 in the direction extending radially from the surface 12a of the core 12 and perpendicular to the longitudinal direction L of the fastener 10. The skilled person will appreciate that the shelf 20 can have an infinite number of individual widths W, relating to the infinite possible number of points along the shelf 20.

Referring again to FIG. 3, the fastener 10 can be configured such that the plurality of different gap heights H can accommodate target components having a range of thicknesses. A target component thickness is considered to be accommodated by a gap height H when the target component thickness is less than the maximum gap height ($H_{max}$) of the shelf 20 but greater than the minimum gap height ($H_{min}$) of the shelf 20. The fastener 10 can also be configured such that the plurality of widths W can accommodate target components having openings with a range of sizes, shapes, and dimensions. A target component opening is considered to be accommodated when a local-maximum-width or a diameter of the opening is less than the combination of the maximum width/diameter of the core 12 and the width(s) of the top surfaces 22 of the prong(s) 16. A particular embodiment fastener may be configured to accommodate a different range of component thicknesses and opening dimensions than a different embodiment fastener, depending upon the application in which the particular fastener will be deployed and the component sizes most common in said application.

Referring to FIG. 3, a shelf 20 has a bottom end 28 and a top end 30, and the shelf 20 has its maximum gap height ($H_{max}$) at its bottom end 28 and has its minimum gap height ($H_{min}$) at its top end 30. At least a portion of the top surface 22 of the shelf 20 is sloped with respect to the bottom surface 14a of the cap 14. As used herein, the term "sloped" means that the gap height H continually increases in one direction along the relevant length of the shelf 20. In an embodiment, the gap height H increases along the entire of the length of the shelf 20. The actual values of $H_{max}$ and $H_{min}$ are not particularly limited, and can be adapted to accommodate the range of thicknesses that are common among target components in a particular application.

Figure 4:
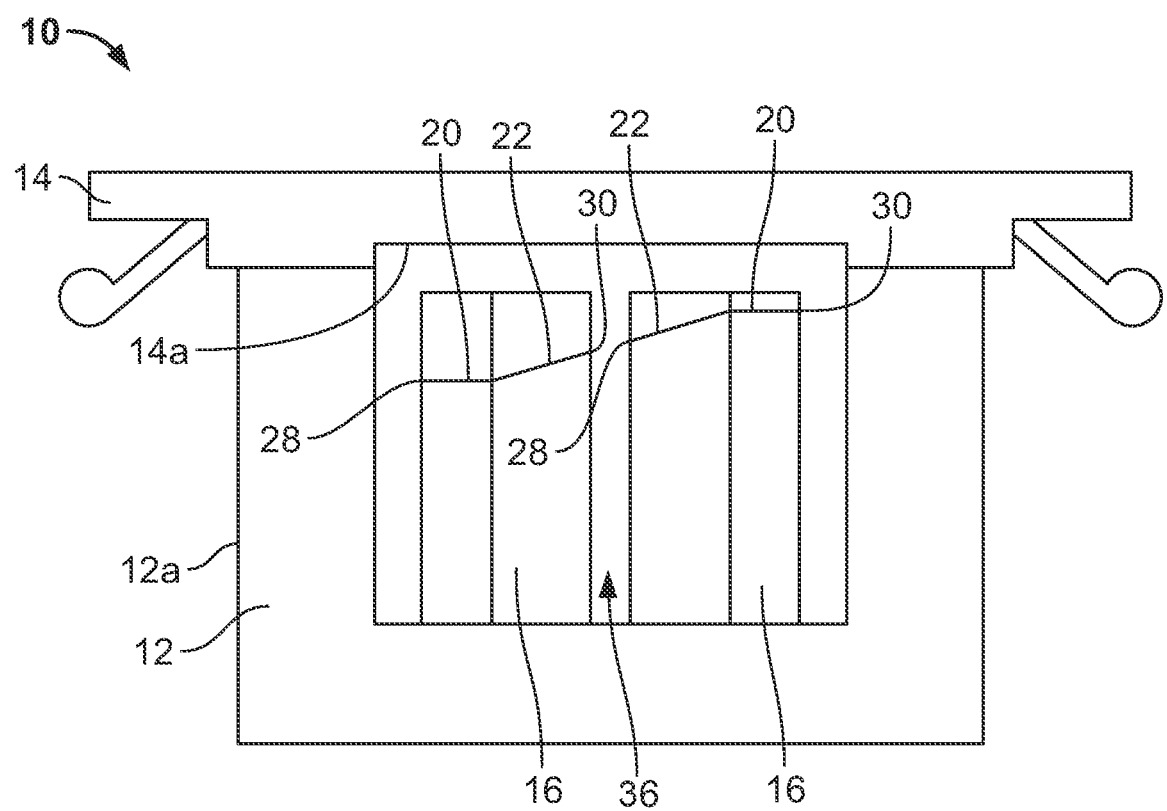
FIG. 4 is a side elevational view of the fastener according to an embodiment of the present disclosure, that includes a split-prong.

As shown in FIG. 4, in an embodiment, one or more of the prongs 16 may be a split-prong. A split-prong is a prong 16 that is divided by a vertical gap 36 that runs through the prong 16. In this way, a split-prong may be described as a single prong 16 having a shelf 20, the shelf having a top end 30 and a bottom end 28, and a vertical gap 36 located between the top end 30 and the bottom end 28, such that the vertical gap 36 divides the prong 16 into two portions. It is contemplated that a split-prong may comprise more than one vertical gap 36. A split-prong may alternatively be described as two (or more) distinct prongs 16 that are positioned proximate each other, separated by a vertical gap 36, such that each distinct prong 16 has a shelf 20 with its own top end 30 and bottom end 28. Advantageously, a split-prong can allow a fastener 10 to be formed using less material, which may be particularly beneficial for larger fasteners. Additionally, a split-prong may be more flexible, facilitating variation that is more precise. Furthermore, a split-prong can allow the actual values of $H_{max}$ and $H_{min}$ to be adapted to accommodate two or more non-continuous subranges of thicknesses of target components. Some embodiments having a split-prong may be configured not to accommodate target components having a thickness falling between the subranges.

In an embodiment, a shelf 20 also has a maximum width ($W_{max}$) at its top end 30 and a minimum width ($W_{min}$) at its bottom end 28. In an embodiment, the width W of the shelf 20 continually increases along at least a portion of the length of the shelf 20. In an embodiment, the width W of the shelf 20 continually increases along the entire length of the shelf 20. In an embodiment, the width of W of the shelf 20 increases along the length of the shelf 20 to a maximum width $W_{max}$ at a point along the length of the shelf 20 and then subsequently decreases further along the length of the shelf 20, such that $W_{max}$ occurs at some point along the shelf 20 between its bottom end 28 and its top end 30. The actual values of $W_{max}$ and $W_{min}$ are not particularly limited, and can be adapted to accommodate the range of opening sizes/shapes that are common among target components in a particular application.

Figure 5:
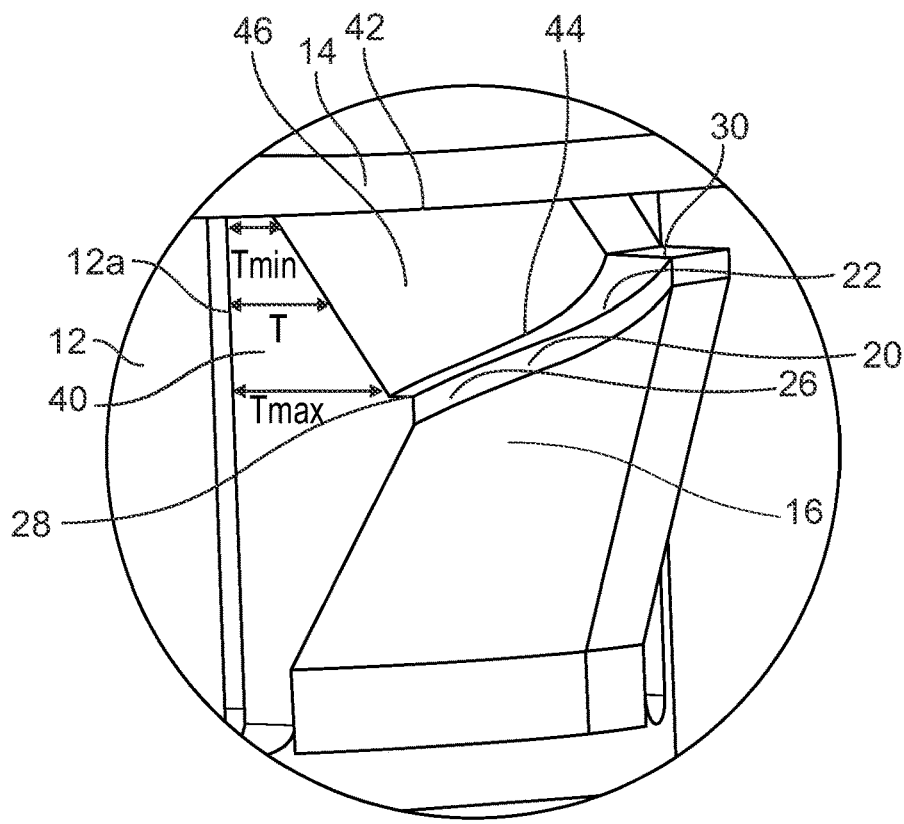
FIG. 5 is a partial, enlarged side elevational view of a prong of the fastener of FIG. 1.

As best shown in FIGS. 3 and 5, at least a portion of the top surface 22 of the shelf 20 may be curved, such that the slope of the top surface 22 is not the same along the entire length of the shelf 20. Although a portion of the top surface 22 of the shelf 20 may be curved, the gap height H of the shelf 22 still increases continuously along the slope of the top surface 22 of the shelf 20. Put another way, the slope of the top surface 22 may vary along the length of the shelf 20, but the sign of the slope of the top surface 22 is consistent along the entire length of the shelf 20. Beneficially, these changes in the slope of the top surface 22 of the shelf 20 can allow the fastener 10 to better engage with a target component.

In the present embodiment, at least a portion of the top surface 22 of the shelf 20 is tilted. As used herein, the term "tilted" means that the top surface 22 of the shelf 20 is shaped such that the distance between the bottom surface 14a of the cap 14 and the outer edge 26 of the shelf 20 is different than the distance between the bottom surface 14a of the cap 14 and the inner edge 24 of the shelf 20 at the same point along the length of the shelf 20. Put another way, the outer edge 26 of the shelf 20 may be raised at points along the length of the shelf 20. In one embodiment, the top surface 22 of the shelf 20 is tilted-inwards, such that the distance between the bottom surface 14a of the cap 14 and the outer edge 26 of the shelf 20 is less than the distance between the bottom surface 14a of the cap 14 and the inner edge 24 of the shelf 20 at the same point along the length of the shelf 20. Beneficially, this may allow the fastener 10 to better engage a target component. Alternatively, the top surface 22 of the shelf 20 may be titled-outwards, such that the distance between the bottom surface 14a of the cap 14 and the outer edge 26 of the shelf 20 is greater than the distance between the bottom surface 14a of the cap 14 and the inner edge 24 of the shelf 20 at the same point along the length of the shelf 20. This may allow the fastener 10 to better accommodate target components of a particular shape.

Referring now to FIG. 5, each prong 16 may also comprise a ramp 40 extending from the core 12. Each ramp 40 has a top edge 42, a bottom edge 44, an outside surface 46, and a plurality of thicknesses T. The thickness of the ramp 40 is defined as the distance from the exterior surface 12a of the core 12 to the outside surface 46 of the ramp 40. The thickness T of the ramp 40 can alternatively be defined as the distance occupied by the ramp 40 in the direction extending radially from the surface 12a of the core 12 and perpendicular to the longitudinal direction L of the faster 10. The top edge 42 of the ramp 40 has a first thickness ($T_1$ or $T_{min}$), and a bottom edge 44 of the ramp 40 has a second thickness ($T_2$ or $T_{max}$). The second thickness ($T_2$) of the ramp 40 is greater than the first thickness ($T_1$), as shown in FIG. 1. The top edge 42 of the ramp 40 may directly engage the exterior surface 12a of the core 12. Alternatively, a portion of the prong 16 may be positioned between the top edge 42 of the ramp 40 and the exterior surface 12a of the core 12, as shown in FIG. 1. Such a portion of the prong 16 may form a plateau 48 between the top edge 42 of the ramp 40 and the exterior surface 12a of the core 12, as shown in FIG. 1. The bottom edge 44 of the ramp 40 may directly engage the inner edge 24 of the shelf 20. The ramp 40 forms a continuous slope between its top edge 42 and its bottom edge 44.

The outside surface 46 of the ramp 40 forms a continuous slope between the top edge 42 of the ramp 40 and the bottom edge 44 of the ramp 40. In an embodiment, the outside surface 46 of the ramp 40 may form a curve between the top edge 42 the bottom edge 44 of the ramp 40. In an embodiment, the outside surface 46 of the ramp 40 may be flat between the top edge 42 the bottom edge 44 of the ramp 40.

Turning to FIG. 6, a bottom view of the fastener 10 is shown. Here, the exterior surface 12a of the core 12 defines a first arc, in this case a circle or a portion thereof. Similarly, the outer edge 26 of the shelf 20 defines a second arc. In an embodiment, the second arc defined by the outer edge 26 of the shelf 20 is different than the first arc defined by the exterior surface 12a of the core 12.

Figure 7:
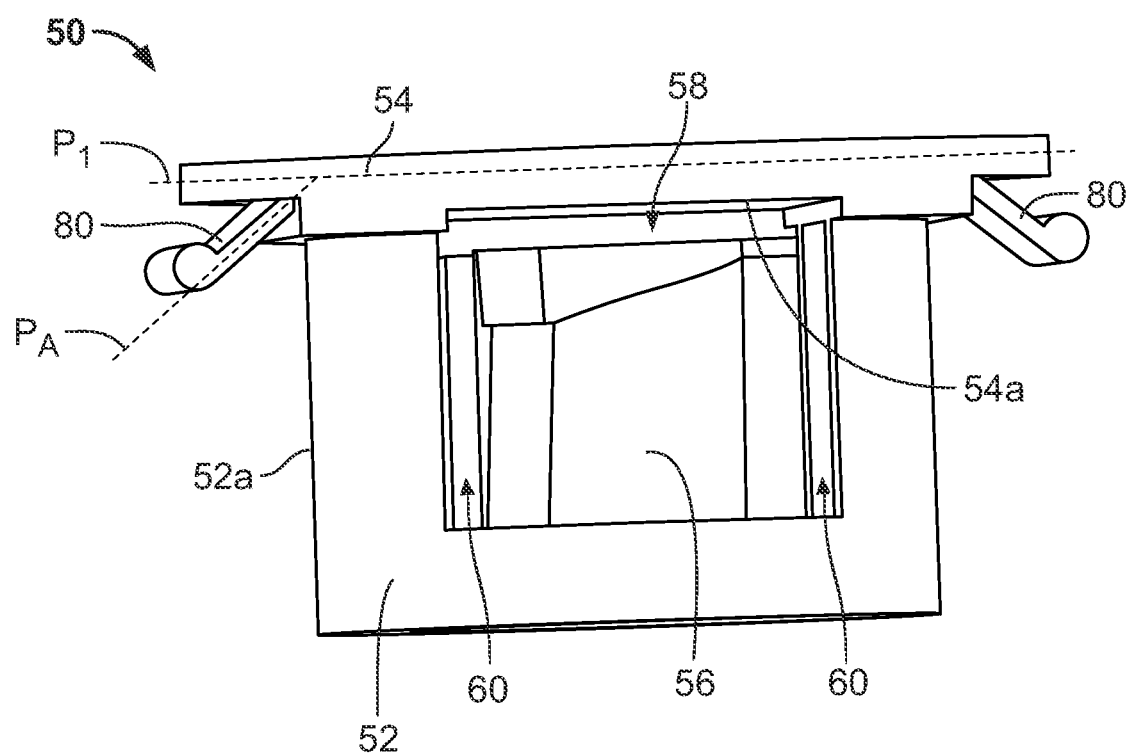
FIG. 7 is a side perspective view of another fastener according to an embodiment of the present disclosure.

FIG. 7 shows a different embodiment of a fastener 50. The fastener 50 is substantially similar to the fastener 10, with the fastener 50 having a core 52, a cap 54, and a plurality of prongs 56. The fastener 50 also has a plurality of wings 80 extending downwardly from the cap 54. The cap 54 can be described as defining a first plane ($P_1$) and each wing 80 can be described as defining an additional plane ($P_A$), wherein each additional plane ($P_A$) forms an oblique angle to the first plane ($P_1$). Beneficially, a fastener 50 having a plurality of wings 80 as described above may better engage a target component, which may be positioned between the wings 80 and prongs 56.

Figure 8:
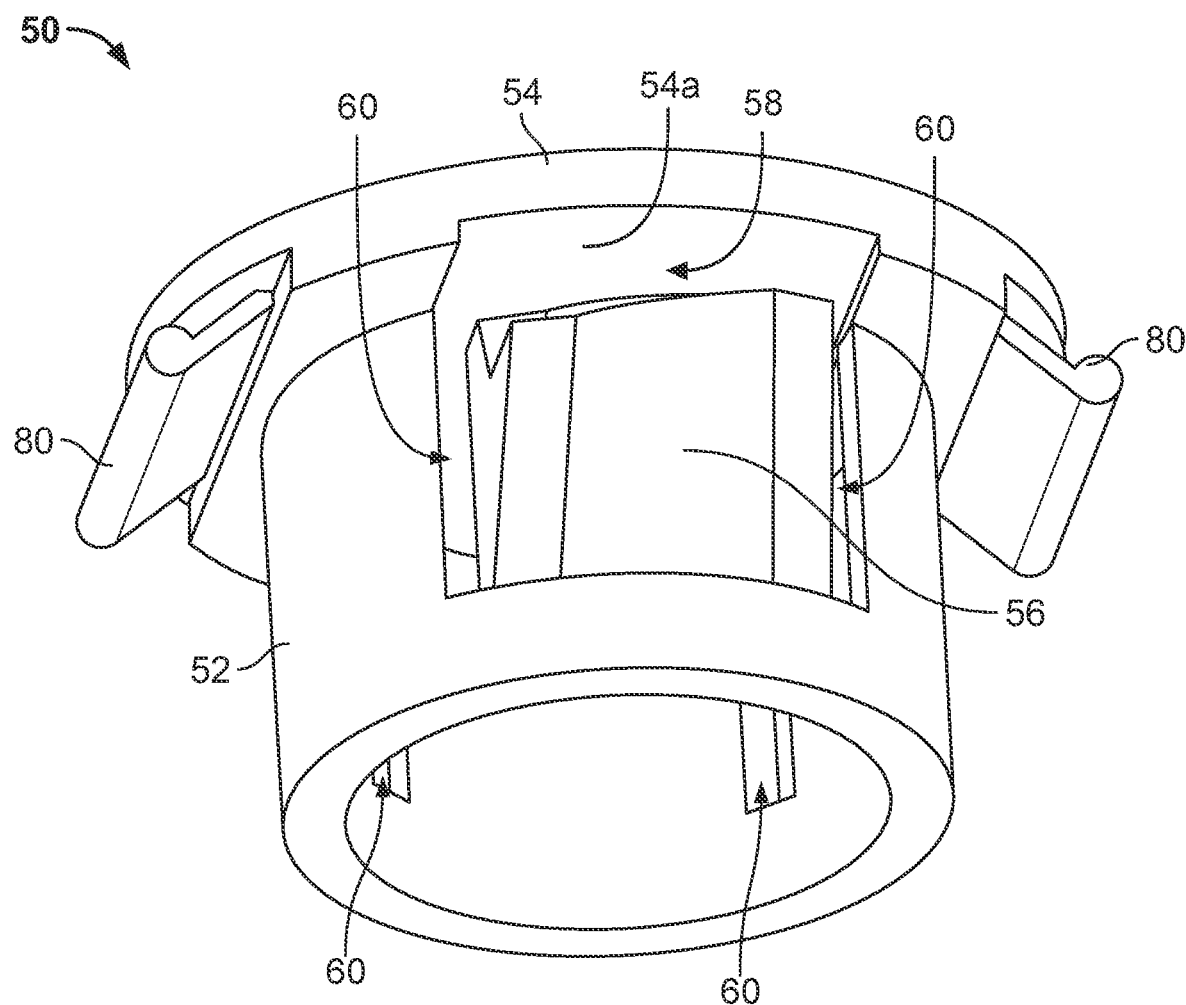
FIG. 8 is a bottom perspective view of the fastener of FIG. 7.

As shown in FIG. 7, a fastener 50 may have at least two prongs 56 that are positioned opposite each other about the core 52. The fastener 50 may also have at least two wings 80 that are also positioned opposite each other about the core 52. In an embodiment, the wings 80 and the prongs 56 may be positioned on the same sides of the core 52. Alternatively, as shown in FIGS. 7 and 8, the wings 80 and the prongs 56 may be positioned on different sides of the core 52.

Returning to FIG. 3, a fastener of the present disclosure may also comprise a panel of a target component, the panel having a top surface and a bottom surface. In FIG. 3, the panel of a target component is shown as 32 and/or 34. Panel 32 has the maximum thickness that fastener 10 is configured to accommodate. Panel 34 has the minimum thickness that fastener 10 is configured to accommodate. A panel 32 and/or 34 may be positioned between the prongs 16 and the cap 14 of the fastener 10. When a panel, such as panel 32, is positioned between prong 16 and cap 14, the engagement between the panel 32 and the cap 14 as well as the engagement between the panel 32 and the prong 16 functions to couple the fastener 10 with the panel 32. The panel 32 may be a panel of a target component and the fastener 10 may be deployed on a base component. In this situation, when the fastener 10 is coupled to the panel 32, the base component is thereby coupled to the target component. It will be appreciated that a similar configuration is possible with panel 34, as well as substantially any panel with a thickness between the thicknesses of panel 32 and panel 34.

It will also be appreciated that a single panel 32, 34 may engage multiple prongs 16. Engagement between a panel 32, 34 and multiple prongs 16 may couple the panel 32, 34 and the fastener 10 more securely than engagement with only a single prong. The material used to form the fastener 10 or any part thereof (e.g., shelf 20, prongs 16, cap 14, core 12, etc.) may also help to securely couple the panel 32, 34 to the fastener 10. Similarly, in one embodiment a coating on the fastener 10 may help to securely couple the panel 32, 34 to the fastener 10. Although not shown in FIGS. 7 and 8, it will be appreciated that a panel may similarly be positioned between the prongs 56 and the cap 54 of the fastener 50. Further, it will be appreciated that such a panel may be positioned such that it is sandwiched between the prongs 56 and the wings 80 of the fastener 50. Put another way, the panel may be positioned such that its top surface engages the plurality of wings 80 and its bottom surface engages the prongs 56. Such a configuration is shown in FIGS. 9A-9C, with fastener 100.

Fasteners of the present disclosure may have a sealing configuration. For example, the fastener may be composed of a soft rubber (such as silicon rubber, EPDM rubber, or other similar thermoplastic polymer), in order to more securely engage the panel of a target component and prevent rotation of the fastener within the opening. In some embodiments, a fastener may have a sealant coating such as an expandable glue, a hot melt, a thermoplastic elastomer, or the like. A fastener having such a sealant coating may be configured to form a water-tight and/or an air-tight seal around a panel of a target component. The sealant coating may be a two-component sealant, often referred to as a 2K sealant. This may be particularly advantageous for applications where the fastener is required to couple a base component to a target component, while also forming a seal around the panel of the target component.

Turning now to FIG. 8, the prongs 56 may be separated from the core 52 on as many as three sides. The prongs 56 may be separated from the core 52 at the lateral sides of the prongs 56 by slots 60. The prongs 56 may also be separated from the core 52 at the top side of the prongs 56 by a gap 58 (best shown in FIG. 7). As shown in FIG. 8, when the prongs 56 are separated from the core 52 at the top side and lateral sides of the prongs 56, the prong 56 must then be connected to or integral with the core 52 on the bottom side of the prongs 56. It is contemplated that the prongs 56 may alternatively be separated from the core 52 at a bottom side of the prongs 56, while being connected to or integral with the core 52 at the top side of the prongs 56. Alternatively, it is contemplated that the prongs may not be separated from the core on any side, or put another way, that the prongs may be integral to the core on all sides of the prong.

Figure 9A:
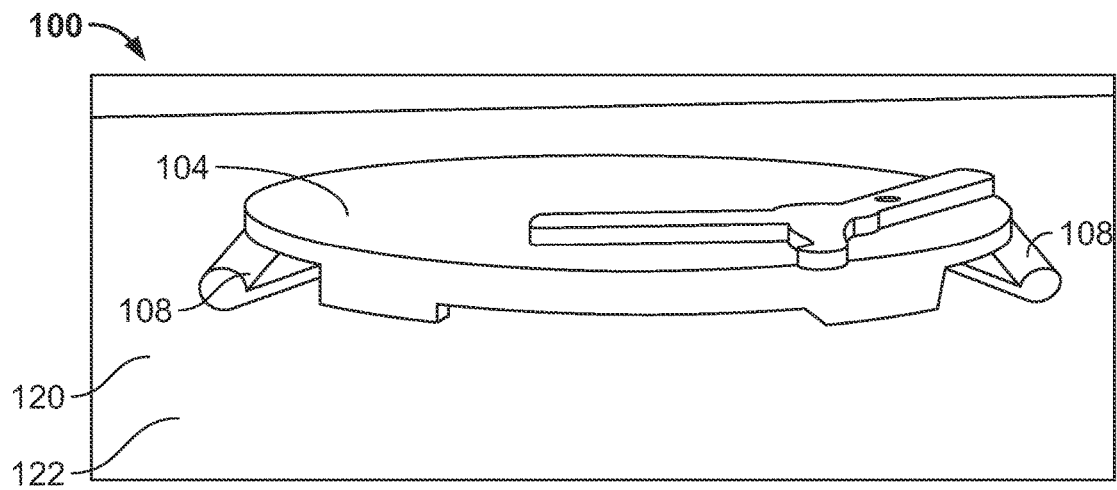
Figure 9B:
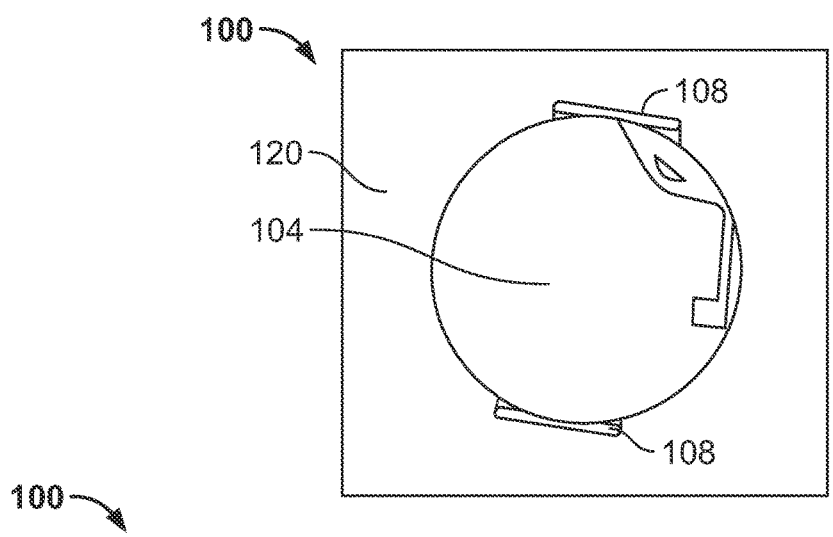
Figure 9C:
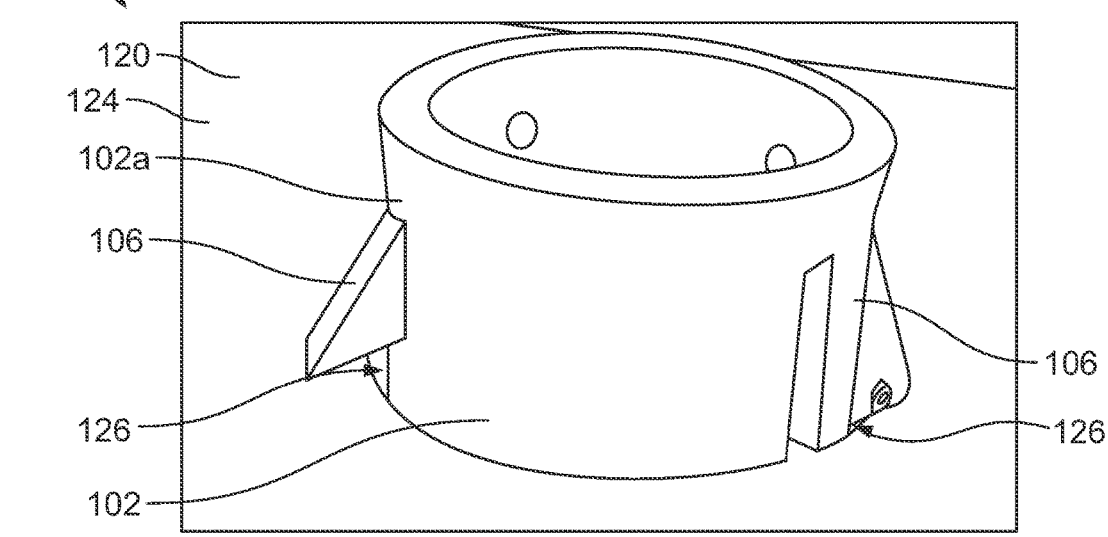

Referring now to FIGS. 9A-9C, a fastener 100 is shown, wherein the fastener 100 is coupled with a panel 120 of a target component, the panel having a top surface 122, a bottom surface 124, and an opening 126. The fastener 100 is substantially similar to fastener 10 and fastener 50. The fastener 100 has a core 102 with an outside surface 102a, a cap 104, and a plurality of prongs 106. The fastener 100 also has a plurality of wings 108. The fastener 100 is configured such that the core 102 is positioned within the opening 126 of the panel 120 and the top surface 122 of the panel 120 engages the wings 108 while the bottom surface 124 of the panel 120 engages the prongs 106.

In one embodiment, the fastener 100 may be configured such that it sealingly engages with the panel 120, wherein the outside surface 102a of the core 102 sealingly engages the edges of the panel 120 about the opening 126. The sealing engagement may be facilitated by the material from which the fastener 100 is formed and/or by a sealant coating added to the fastener 100. For example, the fastener 100 may be composed of a soft rubber (such as silicon rubber, EPDM rubber, or other similar thermoplastic polymer), in order to more securely engage the panel 120 and prevent rotation of the fastener 100 within the opening 126. The fastener 100 may also have a sealant coating, which may be an expandable glue, a hot melt, a thermoplastic elastomer, or the like. The sealant coating may be a two-component (2K) sealant.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

Variations and modifications of the foregoing are within the scope of the present disclosure. It is understood that the embodiments disclosed and defined herein extend to all alternative combinations of two or more of the individual features mentioned or evident from the text and/or drawings. All of these different combinations constitute various alternative aspects of the present disclosure. The claims are to be construed to include alternative embodiments to the extent permitted by the prior art.

To the extent used in the appended claims, the terms "including" and "in which" are used as the plain-English equivalents of the respective terms "comprising" and "wherein." Moreover, to the extent used in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

Various features of the disclosure are set forth in the following claims.

The invention claimed is:

1. A fastener, comprising:
   a core;
   a cap; and
   a plurality of prongs extending from the core, each prong comprising a shelf having a top surface, an inner edge, and an outer edge, and each shelf having a plurality of different gap heights and a plurality of different widths,
   wherein the gap height is defined by the distance between the top surface of the shelf and a bottom surface of the cap, and
   wherein the widths are defined by the distance between the outer edge of the shelf and the inner edge of the shelf.

2. The fastener of claim 1, wherein at least a portion of the top surface of the shelf is sloped relative to the bottom surface of the cap.

3. The fastener of claim 2, wherein each shelf has a top end and a bottom end; and wherein each shelf has a maximum gap height at the bottom end and a minimum gap height at the top end.

4. The fastener of claim 3, wherein each shelf has a maximum width at the top end and a minimum width at the bottom end.

5. The fastener of claim 2, wherein at least a portion of the top surface of each shelf is curved.

6. The fastener of claim 1, further comprising a panel having a top surface and a bottom surface, wherein the panel is positioned such that the top surface of the panel engages the bottom surface of the cap and wherein the bottom surface of the panel engages the top surface of the shelf of at least one of the plurality of prongs.

7. The fastener of claim 1 further comprising a plurality of wings extending from the cap;
    wherein the cap defines a plane and each wing defines a plane, and
    wherein the plane defined by each wing forms an oblique angle to the plane defined by the cap.

8. The fastener of claim 7, wherein the plurality of prongs includes two prongs positioned opposite each other about the core; and
    the plurality of wings includes two wings positioned opposite each other about the core.

9. The fastener of claim 8, further comprising a panel having a top surface and a bottom surface, wherein the panel is positioned such that the top surface of the panel engages the plurality of wings and the bottom surface of the panel engages the top surface of the shelf.

10. The fastener of claim 9, further comprising a sealant coating selected from the group consisting of an expandable glue, a hot melt, and a thermoplastic elastomer.

11. A fastener, comprising:
    a core having an exterior surface;
    a cap having a bottom surface; and
    a plurality of prongs extending from the core,
    wherein each prong comprises a ramp extending from the core and having a top edge with a first thickness and a bottom edge with a second thickness, the second thickness greater than the first thickness, and
    wherein each prong comprises a shelf extending away from the bottom edge of the ramp and having a top end and a bottom end, wherein the distance between the bottom surface of the cap and the bottom end of the shelf is greater than the distance between the bottom surface of cap and the top end of the shelf.

12. The fastener of claim 11, wherein the distance between the bottom surface of the cap and the top edge of the ramp is less than the distance between the bottom surface of the cap and the bottom edge of the ramp.

13. The fastener of claim 12, wherein the core has an exterior surface and the shelf has an outer edge, and the distance between the exterior surface of the core and the outer edge of the shelf is greater at the top end of the shelf than at the bottom end of the shelf.

14. The fastener of claim 13, further comprising a plurality of wings extending from the cap, wherein the cap defines a plane and each wing defines a plane, and wherein the plane defined by each wing forms an oblique angle to the plane defined by the cap.

15. The fastener of claim 14, further comprising a panel having a top surface and a bottom surface, wherein the panel is positioned such that the top surface of the panel engages the plurality of wings and the bottom surface of the panel engages the plurality of prongs.

16. The fastener of claim 15, further comprising a sealant coating selected from the group consisting of an expandable glue, a hot melt, and a thermoplastic elastomer.

17. A fastener, comprising:
    a core;
    a cap; and
    a plurality of prongs extending from the core, each prong comprising a ramp extending from the core and having an outside surface, a top edge, and a bottom edge, and each prong comprising a shelf extending away from the core and having a top surface, an outer edge, a top end, and a bottom end,
    wherein the distance between an exterior surface of the core and the outside surface of the ramp is greater at the bottom edge of the ramp than at the top edge of the ramp, and
    wherein the distance between a bottom surface of the cap and the top surface of the shelf is greater at the bottom end of the shelf than at the top end of the shelf.

18. The fastener of claim 17, wherein the distance between the exterior surface of the core and the outside edge of the shelf is greater at the top end of the shelf than at the bottom end of the shelf.

19. The fastener of claim 18, further comprising a plurality of wings extending from the cap, wherein the cap defines a plane and each wing defines a plane, and wherein the plane defined by each wing forms an oblique angle to the plane defined by the cap.

20. The fastener of claim 19, further comprising a panel having a top surface and a bottom surface, wherein the panel is positioned such that the top surface of the panel engages the plurality of wings and the bottom surface of the panel engages both the top surface of the shelf and the outside surface of the ramp.

* * * * *